United States Patent [19]

Kishi et al.

[11] Patent Number: 4,506,331

[45] Date of Patent: Mar. 19, 1985

[54] NUMERICAL CONTROL METHOD

[75] Inventors: Hajimu Kishi, Hino; Masaki Seki, Takaidonishi; Kunio Tanaka, Hachioji, all of Japan

[73] Assignee: Fanuc Ltd, Minamitsuru, Japan

[21] Appl. No.: 389,936

[22] Filed: Jun. 18, 1982

[30] Foreign Application Priority Data

Jun. 20, 1981 [JP]  Japan .................. 56-95639
Jun. 20, 1981 [JP]  Japan .................. 56-95640

[51] Int. Cl.³ .................. G06F 15/46; G05B 19/41
[52] U.S. Cl. .................. 364/474; 318/573; 364/169; 364/191
[58] Field of Search .................. 364/474, 475, 167–171, 364/191–193; 318/573, 570, 569, 574, 571, 568

[56] References Cited

U.S. PATENT DOCUMENTS 3,629,558  12/1971  Coggin .................. 235/151.1
3,806,713   4/1974  Ryberg .................. 318/573
4,150,328   4/1979  Cannon .................. 364/169 X
4,164,693   8/1979  Leenhouts .................. 318/573
4,423,481  12/1983  Reid-Green et al. .......... 364/169 X

OTHER PUBLICATIONS

European Search Report, The Hague, Date: 03-14-84, Examiner: Cornellie.

Primary Examiner—Joseph F. Ruggiero
Attorney, Agent, or Firm—Staas & Halsey

[57] ABSTRACT

A numerical control method for controlling a numerical control device and prereading the numerical control data in a succeeding block during the execution of numerical control in accordance with the current block. A plurality of line segments, each specified by a block of numerical control data, approximate a curve. When the length of a line segment is less than a prescribed length (defined by required machining precision), control of movement of a member such as a tool based on the data specifying said line segment is skipped. This eliminates intermittent tool movement, improves machining precision, and prevents damage to the machine tool.

4 Claims, 11 Drawing Figures

NUMERICAL CONTROL METHOD

BACKGROUND OF THE INVENTION

1. Field of the Invention

This invention relates to a numerical control method and, more particularly, to a numerical control method for application to a numerical control device for reading the numerical control data in a succeeding block during the execution of numerical control as defined by the current block.

2. Description of the Prior Art

The increased use of numerically controlled machine tools and the improvements which have been made in methods of creating numerical control (hereinafter "NC") data now make it possible to produce more sophisticated shapes by numerically controlled machining. Numerically controlled machine tools rely upon interpolation systems of two kinds. One is a linear interpolation system for interpolation along two or three axes simultaneously, and the other is a circular interpolation system for interpolation in XY, YZ and ZX planes, or in planes parallel thereto. In the machining a workpiece into a complex shape such as one having a sculptured (i.e., three-dimensional) surface or profile, the workpiece must be cut continuously by combining the linear and circular interpolation systems. It is also necessary to create the NC data required for such cutting. To this end, curves are approximated by a multiplicity of minute straight line segments or arcs, and NC data is created having one block, including a positional command, for each straight line segment. When a curve is approximated in this manner, the amount of movement specified by one block is extremely small, and may be on the order of only several microns in some cases. It follows then that very little time is required for machining or movement based upon one block of command data. This is particularly so when machining a workpiece made of a soft material such as wood, since cutting speed can be raised significantly.

When a very short time interval is required for movement based upon one block of data, a so-called prereading technique may be employed for reading data in such fashion so as to enhance machining efficiency. Before describing this technique, a conventional method that does not employ prereading is discussed.

In the conventional method, NC data is read in block-by-block, and each time machining or movement based on one block is completed, data from the next block is read in. The data read in followed by a format check, decoding, calculation of the specified amount of movement (namely an incremental value), and by other preprocessing, after which machining or movement is controlled based upon said next block. With this method, however, processing executed by the NC device does not keep up with the action of the machine tool because of such factors as preprocessing time and the response of the motor for driving the movable element of the machine tool, such as the table. The attendant disadvantages are reduced machining efficiency and a failure to attain a highly precise machined surface.

The abovementioned prereading technique is employed in an effort to solve these problems. With this technique, the next block of NC data is read in while numerically controlled machining based on the current block is being executed. This is known as "prereading" data. Thus, while numerically controlled machining based on the current or first block is in progress, preprocessing based on the next or second block may be performed in advance. Then, simultaneous with the completion of machining specified by the first block, there is a transition to machining based on the preprocessed data of the second block. Movement based on the second block may therefore be executed immediately without waiting for the completion of preprocessing following movement based on the first block. The result is a more efficient machining operation. Moreover, since control of movement specified by the second block can take place immediately upon completion of the preceding pulse distribution (interpolation) operation, curves, such as rounded corners, can be formed without "jerky" motion of the machine tool. Accordingly, the data prereading method affords the advantages of higher machining efficiency and greater machining precision.

Still, when approximating a curve by a multiplicity of lines or line segments wherein the time for movement specified per block is short, there are often cases where the preprocessing associated with a succeeding block is unfinished at the end of movement specified by the preceding block, even when the data is preread. This causes intermittent movement of the object being controlled, such as a cutting tool, resulting in diminished machining precision, damage to the machine tool, and prolonged machining time.

SUMMARY OF THE INVENTION

The present invention invention seeks to eliminate the aforementioned disadvantages encountered in the prior art.

Specifically, the object of the present invention is to provide a numerical control method for controlling the movement of a tool in such fashion that the length of each of a plurality of straight line segments approximating a curve is not allowed to fall below a prescribed value.

To this end, the present invention provides a numerical control method based on computing the lengths of a plurality of straight line segments that approximate a curve, determining whether the length of each line segment is less than a preset permissible length, and inhibiting control of movement based on a line segment when its length is less than the preset length. In such case the distance from the extension of said line segment to the end point of the next contiguous line segment is computed, and movement is controlled toward the end point of the contiguous line segment if the computed distance is less than a separately entered permissible distance. If not, then movement is controlled toward the starting point of the contiguous line segment. In another aspect of the invention, numerical control data for controlling a tool in the abovementioned manner is created to enable an ordinary numerical control device to be employed without modification thereof.

In accordance with the invention, therefore, preprocessing for a successive increment of movement can be completed while a tool or other movable member is in motion, thereby shortening machining time and preventing intermittent machine operations.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1A-1F, illustrates a method of creating a curved surface on a three-dimensional body;

DESCRIPTION OF THE PREFERRED EMBODIMENT

A curved surface of a three-dimensional metal mold or the like, when drawn out on the plane of a blueprint, is generally represented by a plurality of predefined section curves, but no data is shown for the shapes of the areas lying between the adjacent predefined section curves. When machining the workpiece in accordance with a numerical control method, however, it is essential that the adjacent section curves be connected smoothly, despite the absence of data indicating the shape of the surface between them. In other words, this means that machining must be performed by generating the curved surface lying between the adjacent section curves from the data indicating the predefined section curves, punching a numerical control tape to provide the tape with the data relating to the generated curved surface, and then machining the workpiece in accordance with the instructions on the NC tape.

To this end, a method of creating the curved surface of a three-dimensional body, namely a method of creating NC data has been developed. This method includes generating a plurality of intermediate sections and finding a section curve (i.e., an intermediate section curve) for each of the intermediate sections in accordance with predetermined rules, from section data specifying the predefined sections of the three-dimensional body and from data specifying section curves with in the given sections, and generating data defining the curved surface, namely the NC data, from the plurality of generated intermediate section curves.

Stating this method in another way, a first of two given section curves is, in effect, shifted in space while being modified so as to be superimposed on a second section curve, thereby generating a curved surface. In other words, the plurality of intermediate section curves, when taken together, define the curved surface. In generating an intermediate section curve, uniform correspondence is established between the predefined first and second section curves in their entirety. That is, each of the two section curves is partitioned into M-number of segments to define dividing points on each curve, correspondence is established between the i-th (i=1,2, . . . n) dividing points $P_i$, $Q_i$ on the first and second section curves, respectively, and each of the intermediate section curves is generated on the basis of the corresponding relationship between each pair of points, i.e., between each section curve on which the points lie.

Figure 1:
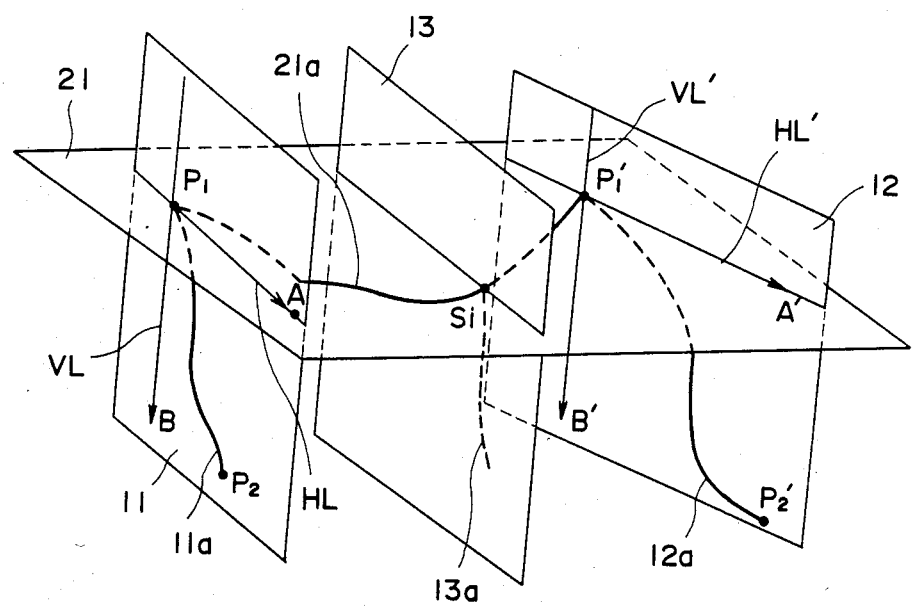
FIG. 1 including
Figure 1:
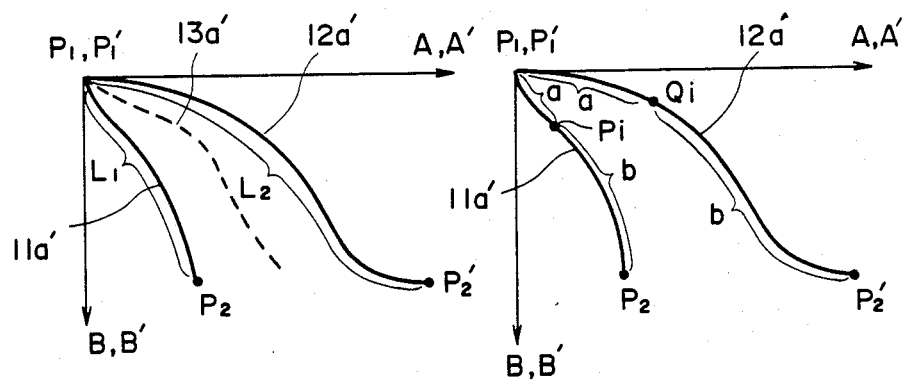
Figure 1:
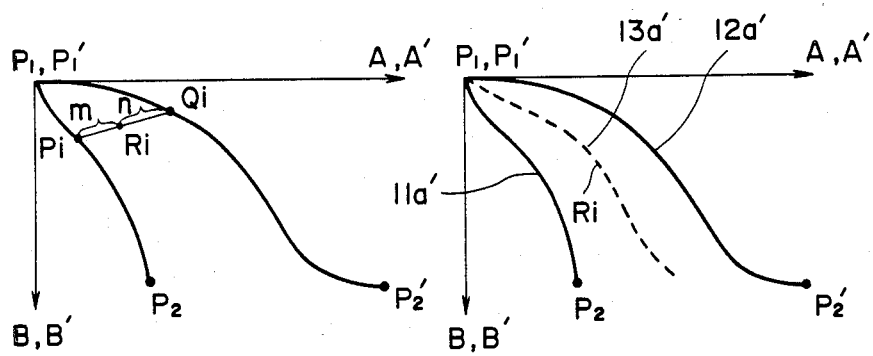
Figure 1:
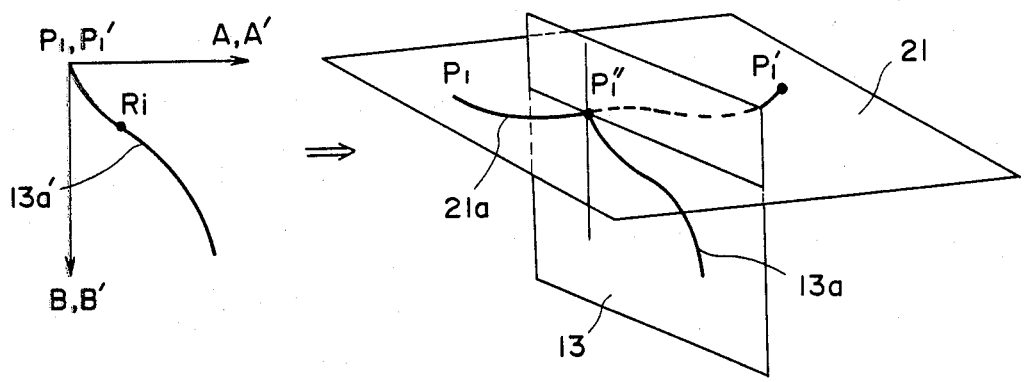

FIG. 1 illustrates a method of creating a surface for a case where two section curves and one reference curve are given. Reference numerals 11 and 12 denote two sections of a three-dimensional body, and 11a and 12a denote predefined or given section curves for a case where the body is cut in the given sections 11 and 12. Reference numeral 21 denotes a reference section containing points $P_1$ and $P_1'$ on the respective section curves 11a and 12a. Numeral 21a denotes a reference curve lying in the reference section 21 and specifying the external form of the body. Numeral 13 designates an intermediate section so generated as to contain a dividing point $S_i$ at which the length of the reference curve 21a is partitioned into two sections having the ratio m:n.

The method of creating a curved surface proceeds in the following manner.

(1) The first step is to enter data specifying: the given sections 11 and 12; the given section curves 11a and 12a; the reference section 21; the reference curve 21a; the data relating to the corresponding positional relationship between the given section curves 11a and 12a; information on the partitioning of the reference curve; and the intervals at which the section curves are partitioned. It will be assumed that point $P_1$ corresponds to point $P_1'$, and that point $P_2$ corresponds to point $P_2'$. Further, the number of partitions or the partition intervals are entered as the partition information.

(2) The next step is to find the coordinates of the dividing point $S_i$, at which the reference curve 21a is partitioned into two sections having the ratio m:n, using the partition information entered in the foregoing step. For example, letting the number of partitions be M, the coordinates of the dividing point $S_i$ may be found through the following steps (2-1) through (2-4), explained below. We will assume that M=m+n.

(2-1) The length of each element constituting the reference curve 21a is found (where the term "element" is taken to mean a line segment or an arc), and the obtained lengths are added together to find the total length D of the reference curve.

(2-2) The equation $m/(m+n) \cdot D = D'$ is solved for $D'$.

(2-3) An element is extracted containing a point at a distance $D'$ from one end, which point serves as a reference point for partitioning. If $D_1$ is taken as the length of the initial element, $D_2$ as the length of the next element, $D_i$ as the length of the i-th element and so on, the extraction of elements is carried out by finding the k that satisfies the following inequality:

$$\sum_{i=1}^{k-1} D_i \leq D' \leq \sum_{i=1}^{k} D_i$$

(2-4) This step is to find the point on the k-th element whose distance from the starting point thereof is $D''$, where $D''$ is found from:

$$D'' = D' - \sum_{i=1}^{k-1} D_i$$

The obtained point is that which partitions the given curve into the ratio m:n from one end thereof. It will be assumed that, in step (2-3), $$\sum_{i=1}^{k-1} D_i = 0$$

where k=1. Therefore, if we let M=M+n and m=m+i, and if i is varied over integral numbers from 0 to M−1 [namely i=0,1,2 . . . (M−1)], then we can find the coordinates of each dividing point $S_i$ that divides the reference curve uniformly into M partitions.

(3) The given section curves $11a$ and $12a$ are transformed into the same plane (FIG. 1B). It should be noted that the given curves $11a$ and $12a$ can be considered to be curves which lie on the same plane if they are manipulated by the following steps (3-1) through (3-3):

(3-1) The points of intersection $P_1$ and $P_1'$ between the reference curve $21a$ and the given sections 11 and 12 are taken as the same point.

(3-2) When the lines of intersection HL and HL' (in FIG. 1A), between the reference section 21 and the given section 11 and 12 are considered, it is seen that both of these lines HL and HL' are divided into two segments by the points of intersection $P_1$ and $P_1'$, respectively. Of these divided segments, those that have the same direction (A, A') with respect to the reference curve $21a$ are superposed.

(3-3) When straight lines VL and VL' (which respectively pass through the points of intersection $P_1$ and $P_1'$ of the reference curve $21a$ and the two given sections 11 and 12, and which are normal to the reference curve $21a$), are considered, it is seen that these lines of intersection, VL and VL', are divided into two segments by the points $P_1$, $P_1'$, respectively. Of these partitioned segments, those that have the same direction (B, B') with respect to the reference curve $21a$ are superposed. Thus, the given section curves $11a$ and $12a$ are transformed into the respective curves $11a'$, and $12a'$ on the same plane, as shown in FIG. 1B.

(4) By using the two given section curves $11a'$, $12a'$ lying in the prescribed plane obtained from step (3) above, an intermediate section curve $13a'$ is generated in the plane.

The intermediate section curve $13a'$ is generated through the following procedure. Note that the division interval N (mm) is an input quantity.

(4-1) On the given section curves $11a'$, $12a'$, the respective lengths $L_1$, $L_2$ of the portions from $P_1$ to $P_2$ and from $P_1'$, $P_2'$ are found. See FIG. 1B.

(4-2) The operations specified by $M_1=(L_1/N)$, $M_2=(L_2/N)$ are performed, and the magnitudes of $M_1$ and $M_2$ are compared. The larger value is taken to be the number of partitions of the line segments $P_1P_2$ and $P_1'P_2'$. We will assume that $M_1 > M_2$. Note that $M_1$ and $M_2$ are whole numbers obtained by rounding fractions up to the next higher unit value.

(4-3) The segments $P_1P_2$ and $P_1'P_2'$ are partitioned into $M_1$ segments. The partitioning process is executed using steps (2-2) and (2-3) described above, and results in finding the dividing points $P_i$, $Q_i$ (i=1, 2, 3, ... ). See FIG. 1C.

(4-4) A dividing point $R_i$ is computed, which point partitions a straight line connecting the dividing points $P_i$, $Q_i$ at the partitioning ratio m:n of step (2). See FIG. 1D.

If we let the coordinates of the dividing points $P_i$, $Q_i$ be $(x_1,y_1)$ and $(x_2,y_2)$, respectively, then the coordinates of the dividing point $R_i$ (X, Y) may be calculated from:

$$X = x_1 + \frac{m}{m+n}(x_2 - x_1)$$

$$Y = y_1 + \frac{m}{m+n}(y_2 - y_1)$$

(4-5) Thereafter, i is incremented through the integral values ranging from 1 to $M_1-1$ (that is, 1,2 ... $M_1-1$) to create the intermediate section curve $13a'$ constituted by the series of dividing points $R_i$ (i=1,2 ... ). See FIG. 1E.

(5) The intermediate section curve $13a'$ on the prescribed plane found in step (4) is transformed into a curve lying in the defined spacial intermediate section 13 (FIG. 1A). The equation for the transformation that transforms the prescribed plane obtained from step (3) into the intermediate section 13 can be expressed by a combination of parallel and rotational translation in space. The transformation equation generally is expressed in the form of a matrix. Accordingly, by setting up the transformation matrix for the points $R_i$ (i=1,2 ... ) obtained in step (4), the points $R_i$ can be transformed into points in defined space. The curve connecting the series of points in the defined space obtained by the matrix transformation is the intermediate section curve $13a$ in the intermediate section 13. See FIG. 1F.

Following the above, the operations m=i+1, n=M−m are performed to find the coordinates of the next dividing point $S_{i+1}$ of reference curve $21a$, and steps (2) through (5) are repeated. In this manner a curved surface is created as a collection of multiple intermediate section curves.

To create the NC data specifying the intermediate section curve $13a$, one block of positional command data is prepared in the form of the coordinate values (absolute values, by way of example) obtained when a point $R_i$ is transformed into the defined space (e.g., plane 13). Then, in similar fashion, individual blocks of positional command data are prepared for all of the points $R_i$ (i=1,2 ... ) constituting the curve $13a$. This provides the necessary NC data for the curve $13a$. All of the necessary NC data for the curved surface is obtained by aggregating the NC data relating to the intermediate sections containing each of the dividing points $S_i$ [i=1,2 ... (M−1)].

As stated earlier, the dimensions of the surface shape lying between section curves are not given. Therefore, the following holds in connection with the machining of a curved surface. Specifically, though a workpiece can be machined into a curved surface if the cutting tool is moved in accordance with the NC data created as described above, it is not necessary to move the cutting tool entirely in accordance with NC data since the shapes of the intermediate sections are not given. If cutting is capable of being carried out in such fashion so as to smoothly connect two given section curves, then it is permissible to machine a workpiece with a portion of the NC data omitted. Accordingly, in the present invention, a permissible travelling distance (described below) is set so as to enable smooth cutting of a surface, and a portion of the NC data is deleted so as to move the cutting tool over the permissible travelling distance, whereby the distance traversed by the tool compared to that defined by the machining data is increased.

Figure 2:
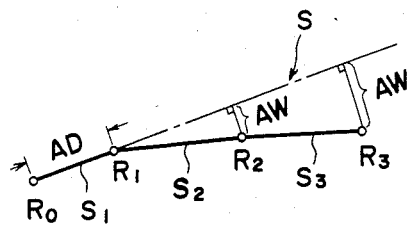
FIG. 2 illustrates a machining method according to the present invention.
Figure 3:
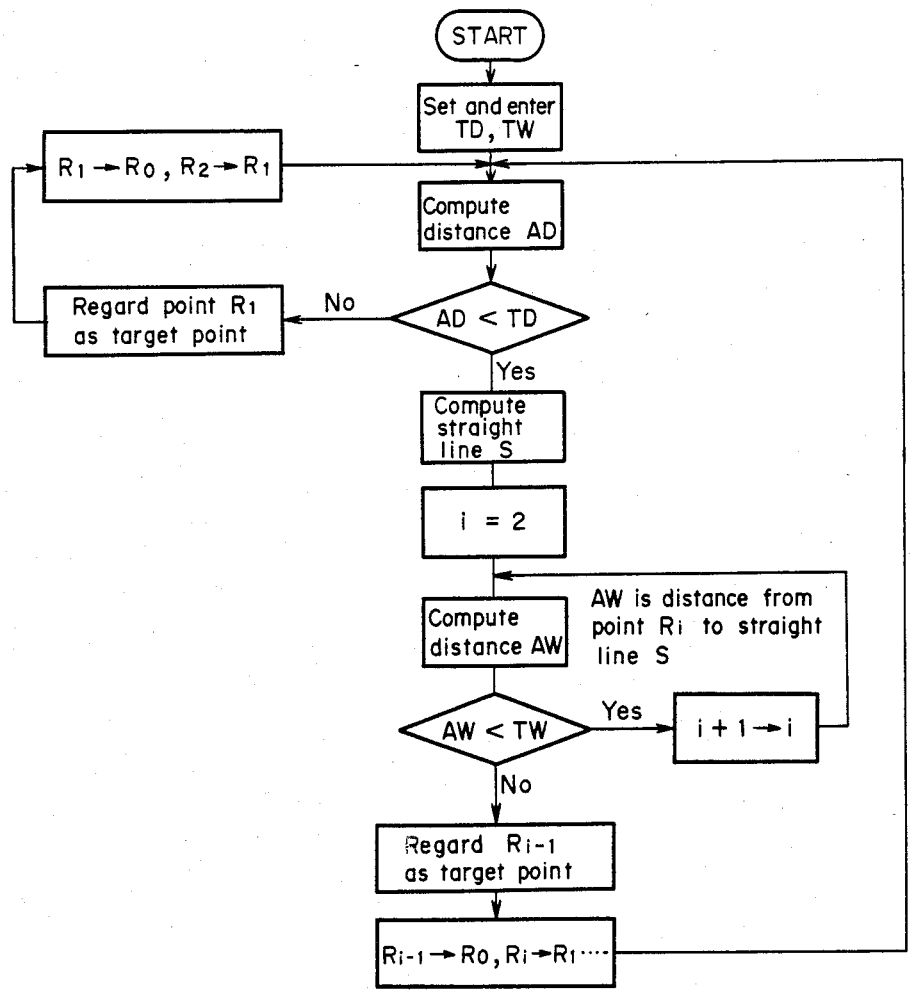
FIG. 3 is a flowchart of processing according to the present invention.

FIG. 2 illustrates a machining method according to the present invention and shows an enlargement of an intermediate section curve. A processing flowchart is illustrated in FIG. 3. Reference will be had to these drawings to describe the method of the invention.

(1) The first step is to preset permissible distances TD and TW, determined by the desired machining precision and surface smoothness. TD serves as a permissible travel distance.

(2) When the current position of the tool is $R_o$, the position of point $R_1$ is found by prereading data, and then the distance, AD, to point $R_1$ is computed.

(3) After the distance AD is found, the magnitudes of AD and TD are compared.

(4) If the relation $AD \geq TD$ holds, then the tool is moved along the straight line $R_oR_1$ to point $R_1$, during which time $R_1$ is regarded as $R_o$ and $R_2$ as $R_1$ (i.e., $R_1 \to R_o$, $R_2 \to R_1$). At this time the next block of data is preread, and steps (2) through (4) are repeated. If the relation $AD < TD$ holds, on the other hand, processing shifts to the next step.

(5) In this step, a straight line S connecting points $R_o$, $R_1$ is computed, i is set equal to 2, and the NC data corresponding to the next point $R_i$ is preread.

(6) Next, the distance AW from the point $R_i$ to the straight line S, which is the extension of $S_1$, is computed.

(7) After the distance AW is found, the magnitudes of AW and TW are compared.

(8) If $AW \geq TW$ holds, then the preceding point $R_{i-1}$ is taken as the target point (end point), and the tool is moved along the straight line $R_{i-2}R_{i-1}$ (e.g., the line $R_oR_1$) to point $R_{i-1}$ (e.g., $R_1$). During tool movement, $R_{i-1}$ is regarded as the new $R_o$ ($R_{i-1} \to R_o$), and hereinafter $R_1$, $R_2$ . . . are determined anew on the basis of $R_{i-1}$, the next block of data is preread, and steps (1) through (8) are repeated. If the inequality $AW < TW$ holds, then the operation $i+1 \to i$ is performed, the NC data corresponding to point $R_i$ is preread, and steps (6) through (8) are repeated.

When the foregoing operations are executed up to the last point $R_n$ of the intermediate section curve and the cutting tool is moved to point $R_n$, machining of the intermediate section curve is complete. Thus, even though the distance between points $R_i$ and $R_{i+1}$ based on the created NC data may be very small, in accordance with the present invention, NC data is omitted or "skipped" so as to move the tool over a larger distance; that is, the permissible travelling distance, thereby lengthening the distance covered by the tool. The increased machining distance allows time to preprocess the next increment of movement while the tool is in motion.

Figure 4:
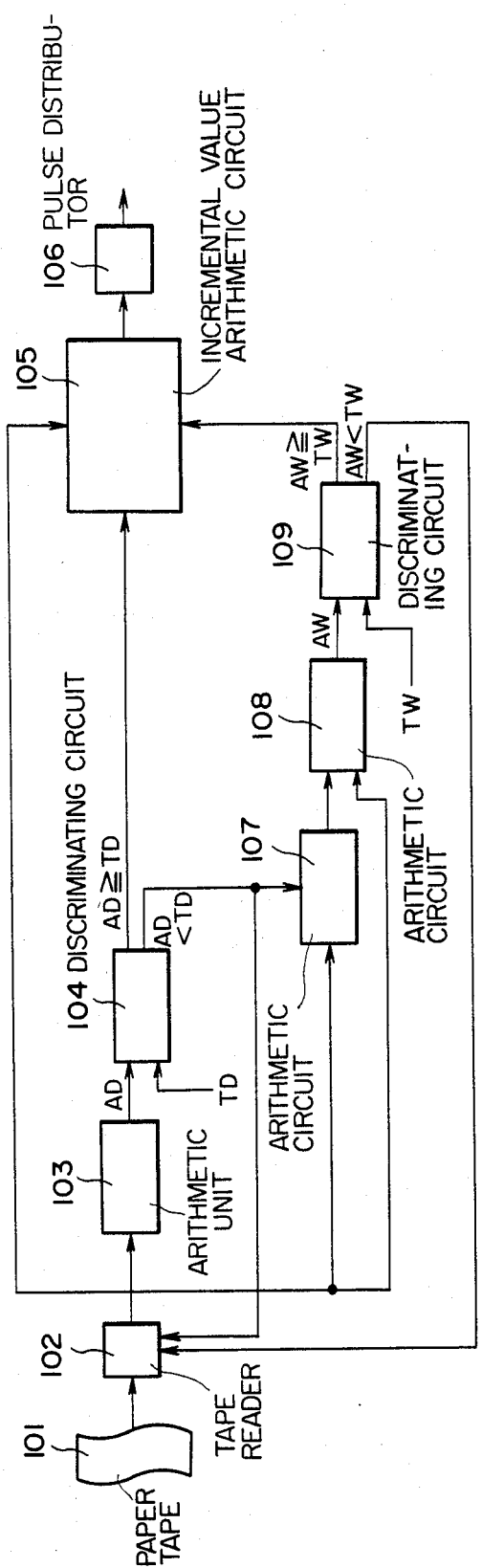
FIG. 4 is a diagram embodying the present invention.

A block diagram of a circuit for practicing the method of the invention is illustrated in FIG. 4. Numeral 101 denotes a paper tape in which NC tape is punched. The paper tape 101 is read by a paper tape reader 102 for reading the data into an arithmetic circuit 103 adapted to compute the distance AD between the points $R_o$, $R_1$ in FIG. 2. The arithmetic circuit 103 delivers a signal indicative of AD to a discriminating circuit 104 for comparing the distance AD against the preset permissible travel distance TD. An arithmetic circuit 105 for computing incremental values receives the output of the discriminating circuit 104 and delivers the incremental values to a pulse distributor 106. When the discriminating circuit 104 detects the condition $AD \geq TD$, the arithmetic circuit 105 computes incremental values from $R_o$ to $R_1$ along each axis. The pulse distributor 106 distributes pulses on the basis of the incremental values and applies the pulses to a servo system, not shown, for transporting the tool. Numeral 107 denotes an arithmetic circuit for computing the straight line S (FIG. 2) when the condition $AD < TD$ holds. An arithmetic circuit 108 receives the output of the circuit 107 and computes the distance AW from the point $R_i$ to the straight line S. A discriminating circuit 109 receives the output AW of the discriminating circuit 107 and compares the distance AW against the preset permissible distance TW. When the condition $AW \geq TW$ is found to hold, the incremental value computing arithmetic circuit 105, taking the point $R_{i-1}$ as the target position, computes incremental values from $R_o$ to $R_{i-1}$ along each axis and delivers these values to the pulse distributor 106. The tape reader 102 reads in the next block of NC data when $AD < TD$ or $AW < TW$ holds.

Figure 5:
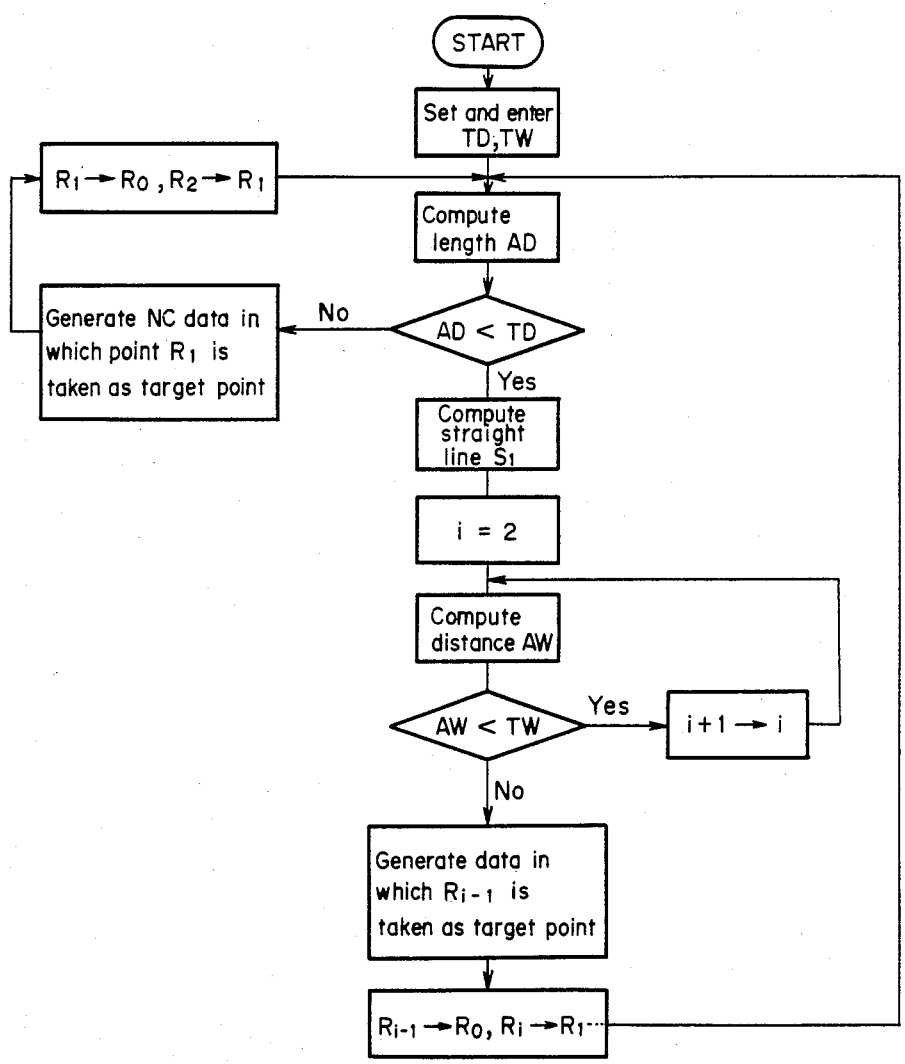
FIG. 5 is a flowchart for creating an NC tape according to the present invention.

Described hereinabove is an example in which various process steps are carried out when executing control of tool movement. It should be noted, however, that the foregoing can be achieved when creating the NC tape. A method of preparing such a tape will now be described with reference to the flowchart of FIG. 5, while referring also to FIG. 2.

(1) The first step is to preset the first and second permissible distances TD, TW, determined by the desired machining precision and surface smoothness.

(2) Next, the distance AD, namely the length of the first straight line segment $R_oR_1$ (on straight line $S_1$), is computed.

(3) After AD is computed, the magnitudes of AD and TD are compared.

(4) NC data is created for the case where the relation $AD \geq TD$ holds, the data specifying, as absolute values, the coordinates of the end point $R_1$ of the straight line $S_1$ toward which the tool is to be moved while travelling along the straight line $S_1$. Thereafter steps (2) through (4) are repeated.

(5) When the relation $AD < TD$ holds, a formula specifying the straight line S1 is computed, i is set equal to 2, and the distance AW from the end point $R_i (=R_2)$ of the straight line $R_1R_2$ (straight line $S_i$) to the straight line S is computed.

(6) After the distance AW is computed, the magnitudes of AW and TW are compared.

(7) NC data is created for the case where $AW \geq TW$ holds, the data taking the end point $R_{i-1} (=R_1)$ of the preceding straight line $S_{i-1} (=S_1)$ as the target point, and moving the tool along the straight line $R_{i-2}R_{i-1}$ ($=R_oR_1$). Thereafter, steps (1) through (8) are repeated, using the conditions $R_{i-1} \to R_o$, $R_i \to R_1$, $R_{i+1} \to R_2$ . . . and so on. If the inequality $AW < TW$ holds, then the operation $i+1 \to i$ is performed, the distance AW from the end point $R_{i+1} (=R_3)$ of the next straight line to the straight line is computed, and steps (6) and (7) are repeated.

Creating NC data by executing the foregoing operations up to the last straight line segment of the intermediate section curve completes the preparation of NC data for the intermediate section curve 13a, in accordance with the invention.

Figure 6:
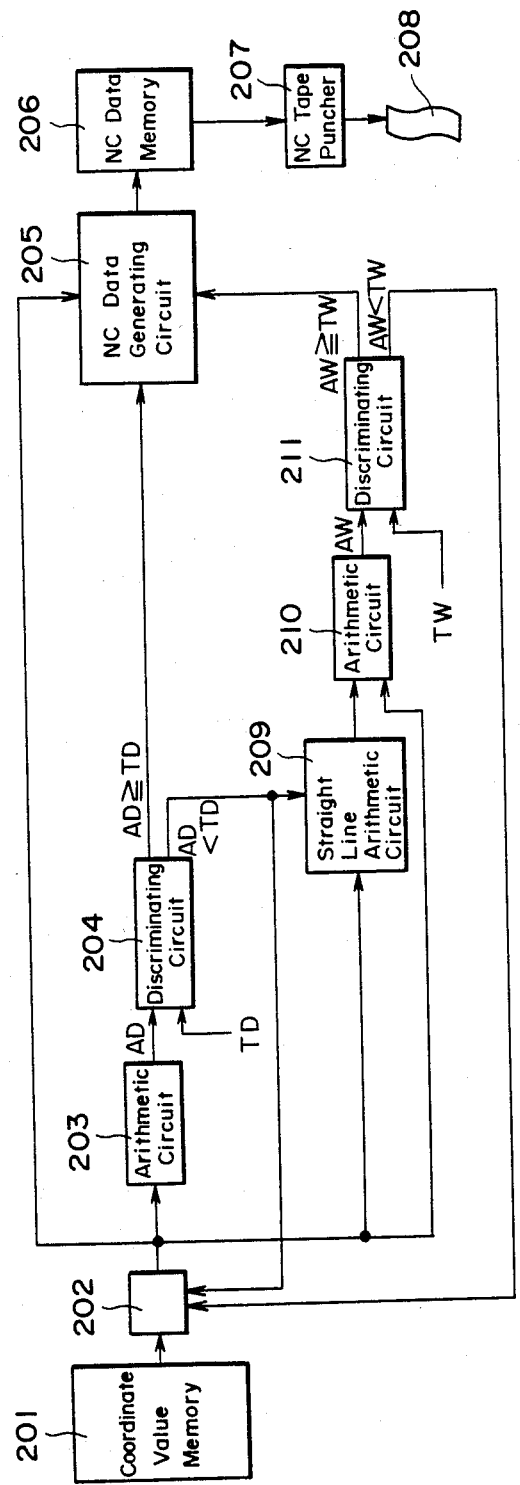
FIG. 6 is a block diagram of a circuit for creating an NC tape according to the present invention.

A block diagram of a circuit for creating the NC data in accordance with the present invention is illustrated in FIG. 6.

Referring to FIG. 6, numeral 201 denotes a memory for storing the coordinates of points $R_i (=1,2 \ldots)$. The output of the memory 201 is connected to a read control circuit 202 for reading the NC data into an arithmetic circuit 203 which computes the distance AD between the starting point $R_o$ and end point $R_1$ of the straight line $S_1$ (FIG. 2), namely the length of the straight line $S_1$. The output AD of the arithmetic circuit 203 is applied to a discriminating circuit 204 which compares the magnitude of AD against the magnitude of the preset first permissible travel distance TD. An NC data generating circuit 205 also receives the data read in by the read control circuit 202, as well as the output of the discriminating circuit 204. The output of the NC data generating circuit 205 is connected to an NC data storage memory 206. When the condition $AD \geqq TD$ holds, the NC data generating circuit 205 generates NC data specifying, in the form of an absolute command, the coordinates of the end point $R_1$ of the straight line $S_1$, which data is stored successively in the NC data storage memory 206. The output of the NC data storage memory 206 is applied to an NC tape puncher 207 for punching the NC data (read successively out of the memory 206), into a paper tape 208. Numeral 209 denotes an arithmetic circuit for computing the straight line $S_1$ (FIG. 2) when the condition $AD < TD$ holds. An arithmetic circuit 210, which receives the output of the circuit 209 and the data read in by the read control circuit 202, computes the distance AW from the point $R_i$ to the straight line $S_1$. The output AW is applied to a discriminating circuit 211 which compares the magnitude of the distance AW against the preset second permissible distance TW. When the condition $AW \geqq TW$ holds, the NC data generating circuit 205 generates NC data in which the point $R_{i-1}$ is the target point. When the condition $AD < TD$ or $AW < TW$ holds, the read control circuit 202 reads in the coordinates of the next point.

Thus, even though the travelling distance specified by one block of NC data may be very small, in accordance with the present invention, that NC data is omitted while maintaining the travelling distance permitted by the desired machining precision, thereby lengthening the distance covered by the tool. This enables preprocessing for the next increment of movement to be completed while the tool is in motion. As a result, the tool (or any controlled element) need not wait for the completion of preprocessing after travelling the specified distance. Instead, the current increment of movement ends at the same time that the next begins, thereby shortening machining time and raising machining efficiency. Moreover, tool movement is substantially continuous rather than intermittent, contributing to the durability of the machine and to a smoother cutting operation.

The foregoing effects can be obtained by creating an NC tape, so that existing numerical control devices may be applied without modification. While hardware has been utilized to construct the arrangements shown in FIGS. 4 and 6, the same can be achieved through use of a microcomputer or the like.

As many apparently widely different embodiments of the present invention can be made without departing from the spirit and scope thereof, it is to be understood that the invention is not limited to the specific embodiments thereof except as defined in the appended claims.

What we claim is:

1. A numerical control method for controlling a machine tool having a movable element, in which a curve is approximated by straight line segments, numerically controlled machining is performed in accordance with numerical control data, including a positional command comprising one block of data, for each of said straight line segments, and preprocessing of said numerical control data is executed by prereading a positional command of a succeeding block of data while executing numerically controlled machining based on a current block of data, said method comprising the steps of:

(a) reading and storing a permissible traveling distance, TD;
   (b) initializing an index, i, for specifying the straight line segment numerical control data to be read;
   (c) reading the data associated with the straight line segment specified by the index;
   (d) computing an actual travelling distance, AD, to be traversed by the movable element in accordance with the positional command associated with the straight line segment specified by the index;
   (e) comparing the magnitude of said travelling distance, AD, against the magnitude of the permissible travelling distance TD;
   (f) controlling the movement of the movable element in accordance with the positional command of the straight line segment specified by the index when the condition $AD \geqq TD$ holds, incrementing the index and repeating steps (c) through (g); and
   (g) omitting control of the movement of the movable element in accordance with the positional command of the straight line segment specified by the index when the condition $AD < TD$ holds, incrementing the index and repeating steps (c) through (g).

2. A numerical control method according to claim 1, wherein step (a) includes reading a permissible distance, TW, and wherein step (g) includes:

(1) computing a straight line including a starting point and an end point specified by the positional command of the straight line segment specified by the index and prereading the positional command associated with the straight line segment specified by the index $+1$;
   (2) computing a distance AW from an end point associated with the next straight line segment specified by the index $+1$, to said computed straight line;
   (3) comparing the magnitude of said distance AW against the magnitude of the permissible distance TW;
   (4) when the condition $AW < TW$ holds, setting the index to index $+1$ and reading the positional command associated with the straight line segment specified by the index and repeating the steps (2) through (5); and
   (5) when the condition $AW \geqq TW$ holds, moving the movable element toward the position defined by the positional command associated with the straight line segment specified by the index.

3. A numerical control method for controlling a machine tool having a movable element, in which a curve is approximated by straight line segments, numerically controlled machining is performed in accordance with numerical control data, including a positional command comprising one block of data, for each of said straight line segments, and preprocessing of said numerical control data is executed by prereading a positional command of a next succeeding block of data while executing numerically controlled machining based on a current block of data, said numerical control data being generated by the steps of:

(a) reading the coordinates of the start and end points of a straight line segment and a permissible travelling distance TD;
   (b) computing the length AD of the straight line segment;
   (c) comparing the magnitude of said length AD against the magnitude of the permissible travelling distance TD;

(d) when the condition $AD \geq TD$ holds, generating numerical control data for moving the movable element along said straight line segment; and (e) when the condition $AD < TD$ holds, omitting the generation of said numerical control data for moving the movable element along said straight line segment.

4. A numerical control method according to claim 3, wherein step (a) includes reading a permissible distance, TW, and wherein step (e) includes:
   (1) computing a distance AW from the end point of a second straight line, contiguous with said straight line, to an extension of said straight line;
   (2) comparing the magnitude of said distance AW against the magnitude of the permissible distance TW;
   (3) when the condition $AW < TW$ holds, repeating steps (1) and (2) with regard to the end point of a subsequent straight line segment contiguous with said second straight line segment until the condition $AW \geq TW$ is established; and
   (4) when the condition $AW > TW$ holds, generating numerical control data for moving the movable element from the starting point of said line segment toward the end point thereof.

* * * * *

UNITED STATES PATENT AND TRADEMARK OFFICE
CERTIFICATE OF CORRECTION

PATENT NO. : 4,506,331
DATED : Mar. 19, 1985
INVENTOR(S) : Hajimu Kishi et al

It is certified that error appears in the above-identified patent and that said Letters Patent is hereby corrected as shown below:

```
Column 1, line 23, delete "the";
          line 50, "in" should be --is--; (2nd occurrence).
          line 54, "said next" should be --the read--;
          line 62, "abovementioned" should be --above-
mentioned--.

Column 2, line 32, delete "invention" (second occurrence);
          line 56, "abovementioned" should be --above-
mentioned--.

Column 3, line 3, "1" should be --1,--;
          line 43, "with in" should be --within--.

Column 4, line 66, "M=M+n" should be --M=m+n--.

Column 6, line 58, after "tool" insert --is increased--;
          line 59, delete "is increased".

Column 10, line 1, "traveling" should be --travelling--.
```

Signed and Sealed this

Seventeenth Day of September 1985

[SEAL]

Attest:

DONALD J. QUIGG

Attesting Officer

Commissioner of Patents and
Trademarks—Designate